3,316,106
REFRACTORY COMPOSITIONS AND METHOD
FOR PREPARING SAME
John H. Montague, Oreland, and Jesse A. Miller, Willow
Grove, Pa., assignors, by mesne assignments, to International Minerals & Chemical Corporation, Skokie, Ill., a corporation of New York
No Drawing. Filed July 21, 1965, Ser. No. 473,866
5 Claims. (Cl. 106—58)

This invention relates to olivine refractory mixes. More specifically it deals with a new bonding material for olivine refractory mixes and a new process for producing olivine refractory mixes containing a new bonding material.

Olivine refractory mixes have been found to be useful for many purposes such as coating foundry molds, making cores or facings for molds and even for pressing into bricks. This olivine which has a theoretical melting point of about 3,300° F. is a magnesium, iron silicate mineral. Although it has this high melting point, it is not always possible to use these olivine refractory mixes to their fullest advantage. There is a problem with the binders used for these refractories. The common binders that are used for other refractories when used with the olivine mixture, lower the melting point of the olivine or do not have sufficient strength at temperatures between 1,000 and 2,000° F.

Sodium silicate, for instance, has been used as a binder for olivine refractory mixes; however, the presence of both sodium and silica lower the fusion point of olivine to a dangerous level. Other common materials are bentonite, kalonitic clay, pitch and trisodium phosphate. All of these materials also lower the melting point of the olivine refractory. It is common practice to add magnesia to raise the fusion point of the olivine mix and offset the effects of these bonding materials. These magnesium compounds, however, are much more expensive than the olivine and also increase plant processing costs.

A liquid mixture of sodium silicate and magnesium hydroxide has been used as a bond for olivine, however, this bond if not used when fresh becomes gelatinous and loses its bonding power. Epsom salts (magnesium sulfate) has also been utilized as a bond for olivine without having the effect of lowering the fusion point. Epsom salts, however, loses its bonding power in the intermediate temperature range of 1,000 to 2,000° F.

Magnesium chloride and magnesium oxide commonly known as Sorel cement has been used in the Scandinavian countries as a bond for olivine. Although this material does not lower the melting point of olivine, it does have several disadvantages. The materials are relatively costly and must be mixed immediately prior to use, otherwise it sets up in a short period of time and will evolve a large quantity of gas and steam when contacted by molten metal, thus presenting a hazard unless the mixture is properly vented. Other mixtures such as magnesium sulfate and magnesium oxide have been used with the same detrimental effects.

It is therefore an object of the present invention to produce a bonding material for olivine refractory mixes which will not lower the fusion point of olivine and does not lose its bonding power at intermediate temperatures (1,000–2,000° F.), thus imparting superior strength to the refractory mix.

Another object of the present invention is to produce a new olivine refractory mix which may be prepared months in advance of actual use.

A further object of the present invention is to produce a bonding material for olivine refractory which is soluble in water and can be dispersed into a refractory mixture and solution considerably simplifying the feeding process.

A still further object of the present invention is to set forth a new process for producing a new refractory composition which may be used in various foundries for coating molds, making cores, facings or even bricks, having superior strength and ease of preparation.

Other objects and advantages of the instant invention will become apparent from the following detailed description and examples.

It is generally known that olivine will react with a variety of inorganic acids to form magnesium salts and colloidal silica. These products, however, are difficult to separate in that the colloidal silica clogs any filter that may be used. For this reason there is no company known to be using olivine as a chemical raw material at this time.

It has been found that olivine fines when reacted with sulfuric acid can produce a bonding agent for olivine refractory mixes which is superior to other bonding agents known up to now, including epsom salts.

In preparing the mix olivine fines are slurried with water in a mixer or in a container in which mixing may take place. Sulfuric acid is then added to the slurry with continued mixing. The reaction takes place rapidly with much steam being given off. The mixture becomes doughy, then hardens into a solid cake. If the reaction has been done properly, the reaction mass continues to dry itself with the result that the cake may be broken up very easily. Ordinarily, this cake is crushed and screened so that it may be more conveniently utilized. A typical analysis of the product is:

| | Percent |
|---|---|
| MgO | 16 |
| $SiO_2$ | 14 |
| FeO | 3 |
| $SO_3$ | 28 |
| Combined water | 37 |

The composition may vary dependent upon the completeness of the reaction and the quantity of water utilized. When this product is mixed with water, the magnesium and sulfates readily dissolve while the silica forms a gelatinous colloid. This characteristic of the product facilitates its use in a liquid form so that it may conveniently be metered into refractory mixes.

It was found that the physical characteristics of the end product could be changed by varying the water in the receipe. For instance, in a typical receipe of 100 grams of olivine flour, 100 milliliters of water and 100 milliliters of 1:1 sulfuric acid it was found that if the water is increased to 140 milliliters the resultant product is a viscous liquid that remains damp after two days. If dried by external heat it yields a hard mass that is difficult to break apart. If the water content falls below 65 milliliters, the resultant product dries too rapidly and complete reaction does not take place. The ideal composition for the reaction is about 80 milliliters of water, although a suitable product could be made if the water ranged from 65 to 100 milliliters with the other ingredients remaining in the same ratio as that above. Some typical examples showing variations in water used in the mix are set forth in the following Table I.

TABLE I.—EFFECT OF VARYING WATER CONTENT UPON THE PHYSICAL CHARACTERISTIC OF OLIBOND

| | Moisture after drying 24 hours | Ign. Loss after drying | Yield, gms. | Physical Characteristics |
|---|---|---|---|---|
| Formula #1A: 100 gms. Olivine #88, 100 ml. $H_2O$, 100 ml. 1-1, $H_2SO_4$ | 22.7 | 31.3 | 320 | Balled near end of reaction and dried in 6 hrs. |
| Formula #2A: 100 gms. Olivine #88, 120 ml. $H_2O$, 100 ml. 1-1 $H_2SO_4$ | 24.3 | 32.6 | 332 | Thick slurry at end, very damp after 2 days. |
| Formal #3A: 100 gms. Olivine #88, 140 ml. $H_2O$, 100 ml. $H_2SO_4$ | 24.4 | 28.97 | 350 | Thick slurry, moist after 2 days. |
| Formula #4A: 100 gms. Olivine #88, 80 ml. $H_2O$, 100 ml. 1-1 $H_2SO_4$ | 22.2 | 31.4 | 304 | Balled, dried in 3 hours. |
| Formula #5A: 100 gms. Olivine #88, 60 ml. $H_2O$, 100 ml. 1-1 $H_2SO_4$ | 21.2 | 25.4 | 284 | Dried in 2 hours, 15 minutes. |
| Formula #6A: 100 gms. Olivine #88, 50 ml. $H_2O$, 100 ml. 1-1 $H_2SO_4$ | 20.9 | 23.6 | 277 | Dried in 2 hours. |

The product produced by the above process maintained its strength at temperatures above that which epsom salts decompose and loses its bonding power. This bonding material forms a chemical bond for the mix at low temperatures when the iron sulfate becomes dry. This drying is possible at room temperatures but may be accelerated through the use of heat. Upon application of moderate heat, the colloidal silica loses its water becoming amorphous silica that is deposited between the grains of the refractory mix, forming a bond. At temperatures above those at which the magnesium sulfate and iron sulfate break down, the silica continues to provide strength to the mix. Thus this composition serves as a binder for the refractory mix through the entire scale from room temperature through intermediate temperatures to high temperatues at which point a true ceramic bond is formed.

This binder has the advantage of adding no new foreign element to the refractory mix that would lower the melting point of the olivine. The only new element added is $SO_3$ which burns out at intermediate temperatures. Olivine refractories bonded with the above binder have a wide range of possible applications. A mixture of olivine aggregate with 3 to 8% bonding agent with or without a small percentage of clay will produce an excellent rammed ladle lining for foundry application. The clay in this case is utilized to impart green strength to the mix but may be dispensed with if this property is not important.

A mixture of 3 to 10% bonding agent with olivine flour of chromite and a suspending agent such as methacel or bentonite produces an excellent wash for coating foundry molds and cores. The wash made in this fashion has much greater strength and refractoriness than washes currently produced with bentonite alone or sugar compounds as a binder.

A mixture of 3 to 8% bonding agent wash on olivine core sand produces an excellent core for foundry practice. Common binders for olivine cores do not have the necessary strength or lower the refractory properties of olivine.

A mixture of 3 to 8% of bonding agent with olivine molding sand may be used to make a facing or a molding sand for foundry practice. This mixture with a small percentage of clay to impart green strength has better strength and refractory properties than mixes commonly used.

Olivine aggregates may be bonded with this bonding agent and pressed into brick forms to produce a low-cost basic refractory brick. Similarly the binder may be also blended with other basic refractory materials such as periclase, magnesia and chrome ore to produce a brick that will have superior intermediate temperature properties.

The superiority of this bonding material for an olivine ladle mix was shown in a test wherein an olivine ladle lining was subject to metal having a temperature as high as 3,400° F. The lining gave longer life than the established material used and showed no signs of erosion. The standard lining was good for 1 to 2 heats while the lining using the new bonding material was still usable after 6 heats. The mixture utilized in this insatnce was in the ratio of 100 pounds of olivine ladle aggregate, 5 pounds of bonding agent, 2 pounds of Western Bentonite, and 5½ pounds of water.

Another test showing the superiority of the new bonding material as compared with sodium silicate bonded material as a lining showed that the sodium silicate bonded material lasted for 2 heats whereas the new bonding material withstood 8 heats.

In another case, where the olivine was applied to the ladle by hand in the form of a mud after being properly dried this lining was in service for several weeks before it failed. This mixture contained a ratio of 100 pounds of ladle aggregate, 4 pounds of Western Bentonite, 5 pounds of bonding agent and 12 pounds of water. It has also been found that the bonding agent when mixed with an olivine refractory sand for making a core for a casting was found far superior to other cores.

The percentage of bonding agent may be increased in any mix above the level shown above. Water is an essential ingredient in all these mixes in order to dispense the binder throughout the mix and to trigger the bonding action. The olivine used for preparing the bonding agent is olivine fines of about a —88 mesh.

It is apparent from the foregoing that there is provided a new refractory bonding composition and a new refractory composition and process for making said compositions. The new refractory bonding composition provides strength to refractory mixes particularly olivine refractories, retaining its bonding properties through intermediate temperatures and achieving a final refractory composition which is more durable and stronger at higher temperature. The process for producing the refractory bonding composition is a simple one in that the composition is self-drying and can be incorporated in a liquid which makes it easy for adding to refractory mixtures, and for storing for long periods of time.

As this invention may be embodied in several forms without departing from the spirit or essential characteristics thereof, the present embodiment is therefor illustrative and not restrictive, and since the scope of the invention is defined by the appended claims, all changes

We claim:

1. A refractory bond forming material consisting essentially of the reaction product of olivine fines, sulfuric acid and water, said materials being in the ratio of 100 ml. 1:1 sulfuric acid per 100 grams olivine and from 65 to 100 ml. water per 100 grams olivine.

2. The composition of claim 1, wherein the water is in the ratio of 80 ml. per 100 grams olivine.

3. A process of producing a refractory bond forming mixture comprising slurrying olivine fines with water, mixing said slurry and adding sulfuric acid with continued mixing, said sulfuric acid being in the ratio of 100 ml. 1:1 sulfuric acid per 100 grams olivine fines and said water being in the ratio of 65 to 100 ml. per 100 grams olivine fines, allowing the mixture to dry, crushing and screening the mixture to produce a granular dry refractory binder.

4. A refractory ladle lining composition consisting essentially of 100 parts by weight olivine aggregate, 2 to 4 parts by weight Western Bentonite, from 5.5 to 12 parts by weight water and 5 parts by weight of a bonding agent consisting essentially of the reaction product of sulfuric acid, olivine fines and water in the ratio of 100 ml. 1:1 sulfuric acid per 100 grams olivine fines and 65 to 100 ml. water per 100 grams olivine fines.

5. A refractory mix comprising a refractory aggregate selected from the group consisting of olivine, magnesia and chrome ore, and from 3 to 10 percent by weight of a refractory bonding agent consisting essentially of the reaction product of sulfuric acid, olivine and water in a ratio of 100 ml. 1:1 sulfuric acid per 100 grams olivine and 65 to 100 ml. water per 100 grams olivine.

References Cited by the Examiner
UNITED STATES PATENTS

| | | | |
|---|---|---|---|
| 1,049,005 | 12/1912 | Steinmetz | 106—58 |
| 1,444,527 | 2/1923 | Scharschu | 106—60 |

OTHER REFERENCES

Pawel: Olivine, A Suggested Source of Magnesia, J. Am. Cer. Soc., vol. 28, No. 12, 1945, pp. 360–362.

TOBIAS E. LEVOW, *Primary Examiner.*

HELEN M. McCARTHY, J. E. POER,
*Assistant Examiners.*